May 23, 1939.    R. GAMBARDELLA    2,159,846
GEAR SHIFTING MEANS
Filed Jan. 4, 1936    5 Sheets-Sheet 1

May 23, 1939.  R. GAMBARDELLA  2,159,846
GEAR SHIFTING MEANS
Filed Jan. 4, 1936  5 Sheets-Sheet 2

INVENTOR
Ralph Gambardella
BY
Thomas A. Jenckes
ATTORNEY

Patented May 23, 1939

2,159,846

UNITED STATES PATENT OFFICE 2,159,846

GEAR SHIFTING MEANS

Ralph Gambardella, Riverview, R. I.

Application January 4, 1936, Serial No. 57,465

23 Claims. (Cl. 74—334)

My invention relates to improvements in gear shifting means for use in motor propelled vehicles.

An object of my invention is to eliminate the usual gear shifting hand lever to bring into mesh the desired selected gear in the transmission. I preferably so construct my device that on the mere depression of the clutch foot pedal the selected gear will be placed in position by means of hydraulic power generated by the depression of the foot pedal, the selected gear being automatically chosen suitable for the then speed of the main drive shaft of the vehicle.

A further object of my invention is to provide a gear shift device of this description, which is at all times under the complete control of the driver, for in my device it is impossible to change the gears without depression of the foot pedal and I have found this is a decided advantage over the fully automatic types of gear shifting device now on the market.

A further feature of my invention is that I preferably employ hydraulic means to actually shift the gears, the hydraulic energy being supplied by the depression of the usual clutch foot pedal and by the use of a hydraulic system I provide a quick positive action.

A further object of my invention relates to improvements not only in the specific construction of hydraulic means I preferably employ, but also improvements in the governor means I employ, automatically controlled in its speed by the speed of the drive shaft to select the proper gear to be changed in proportion to the speed of the drive shaft and for this purpose I employ a novel type of governor actuating electrically controlled switch means.

A further feature of my invention is to provide in combination with hydraulic means controlled by the foot pedal to throw the selected gear into mesh of means also controlled by the depression of the foot pedal to bring the previously chosen actuated gear into neutral position on the initial depression of the clutch foot pedal on the next gear shift.

Further objects of my invention are to provide a smoothly acting mechanism which will function positively and automatically with a minimum amount of shock to provide a gear shift mechanism easy to operate and which will operate without shock and clashings of gears to save wear on the actuated parts of the vehicle.

Further features of my invention relate to improvements in structure of the various component parts thereof to provide a device of relatively few parts and simple and positive in its action.

These and such other objects of my invention as may hereinafter appear will be best understood from a description of the accompanying drawings, which ilustrate one embodiment thereof.

Figure 1:
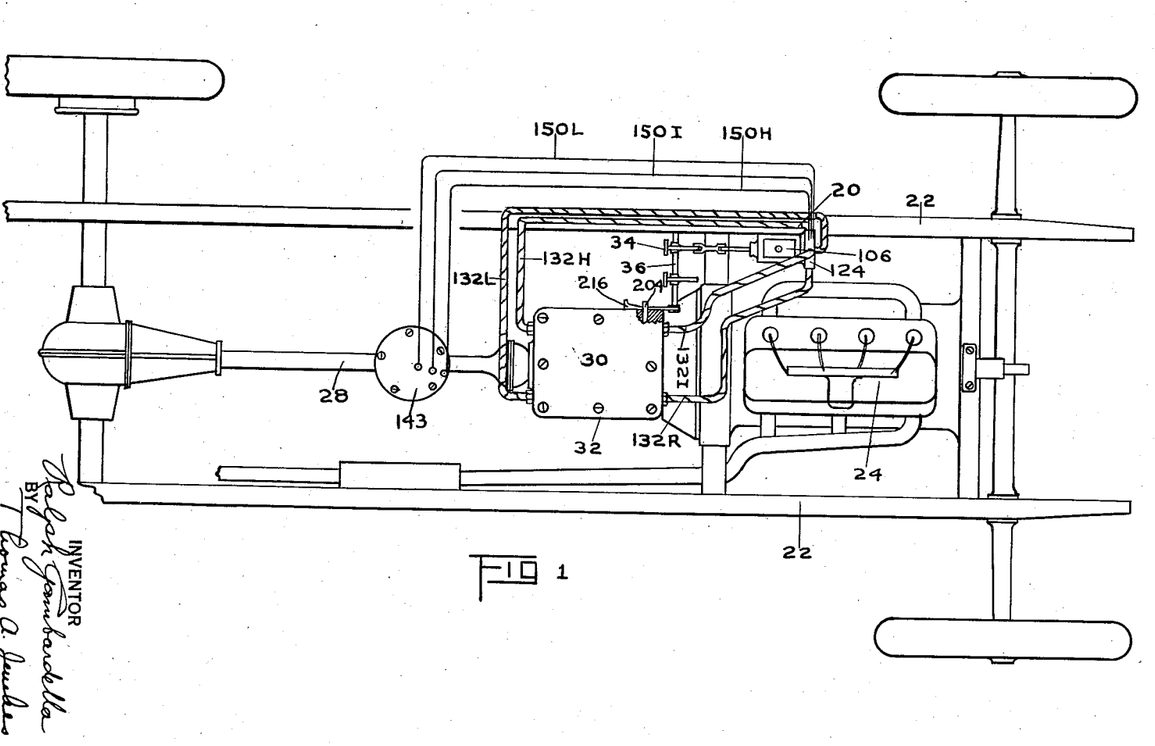
Fig. 1 is a skeleton plan view of an automobile chassis showing my invention attached to the transmission from the motor thereof.

In the drawings, wherein like characters of reference indicate like parts throughout, 20 generally indicates my improved gear shifting device for a vehicle, as shown in Fig. 1 having a chassis 22, a motor 24, a drive shaft 26 contained within its housing 28 and shiftable selective speed gearing 30 contained within a housing 32 therefor. The vehicle shown has the usual shiftable selective sliding gear transmission 30 and is also provided with a clutch pedal 34 to actuate the usual clutch (not shown) and suitably pivotally mounted on the stub shaft 36. Said clutch pedal 34 operates the usual clutch to disengage the engine 24 from the drive shaft 26 during selective changing of the gears in the transmission 30.

Figures 2, 5, 6:
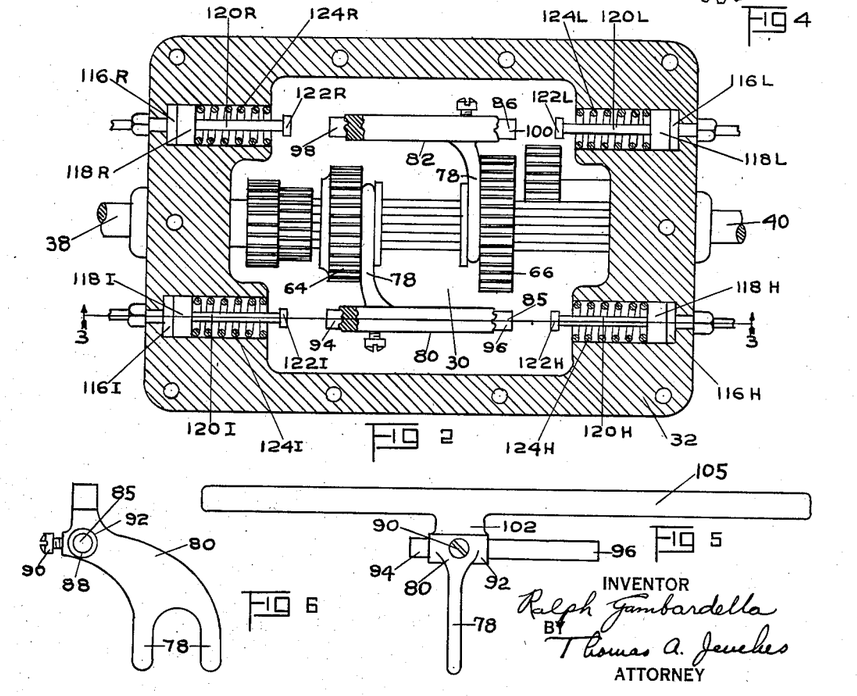
Fig. 2 is a plan view of the housing for containing shiftable selective speed gearing and showing a standard type of selective sliding gear transmission taken along the line 2—2 of Fig. 3.
Fig. 5 is a side elevation of the improved type of shifter fork I preferably employ.
Fig. 6 is an end view of the lower portion of the shifter fork shown in Fig. 5.
Figures 3, 4:
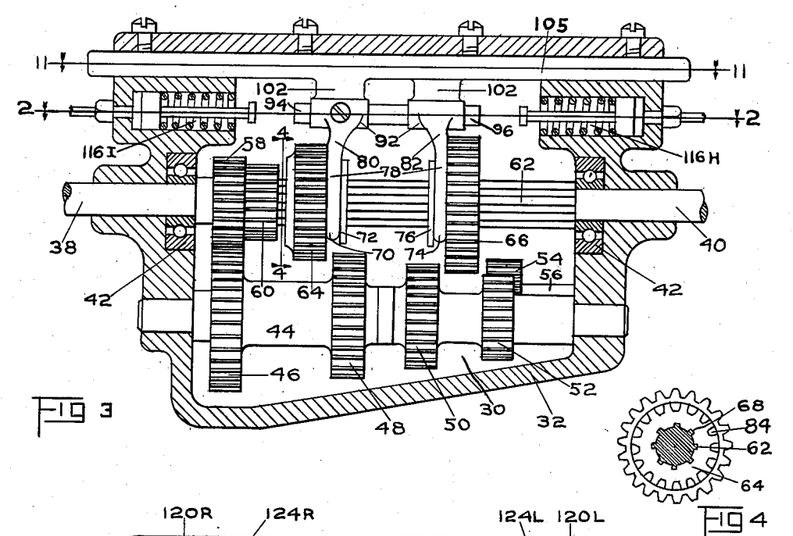
Fig. 3 is a vertical sectional view taken through the transmission housing along the line 3—3 of Fig. 2.
Fig. 4 is a vertical sectional view taken along the line 4—4 of Fig. 3.
Figures 7, 8, 10:
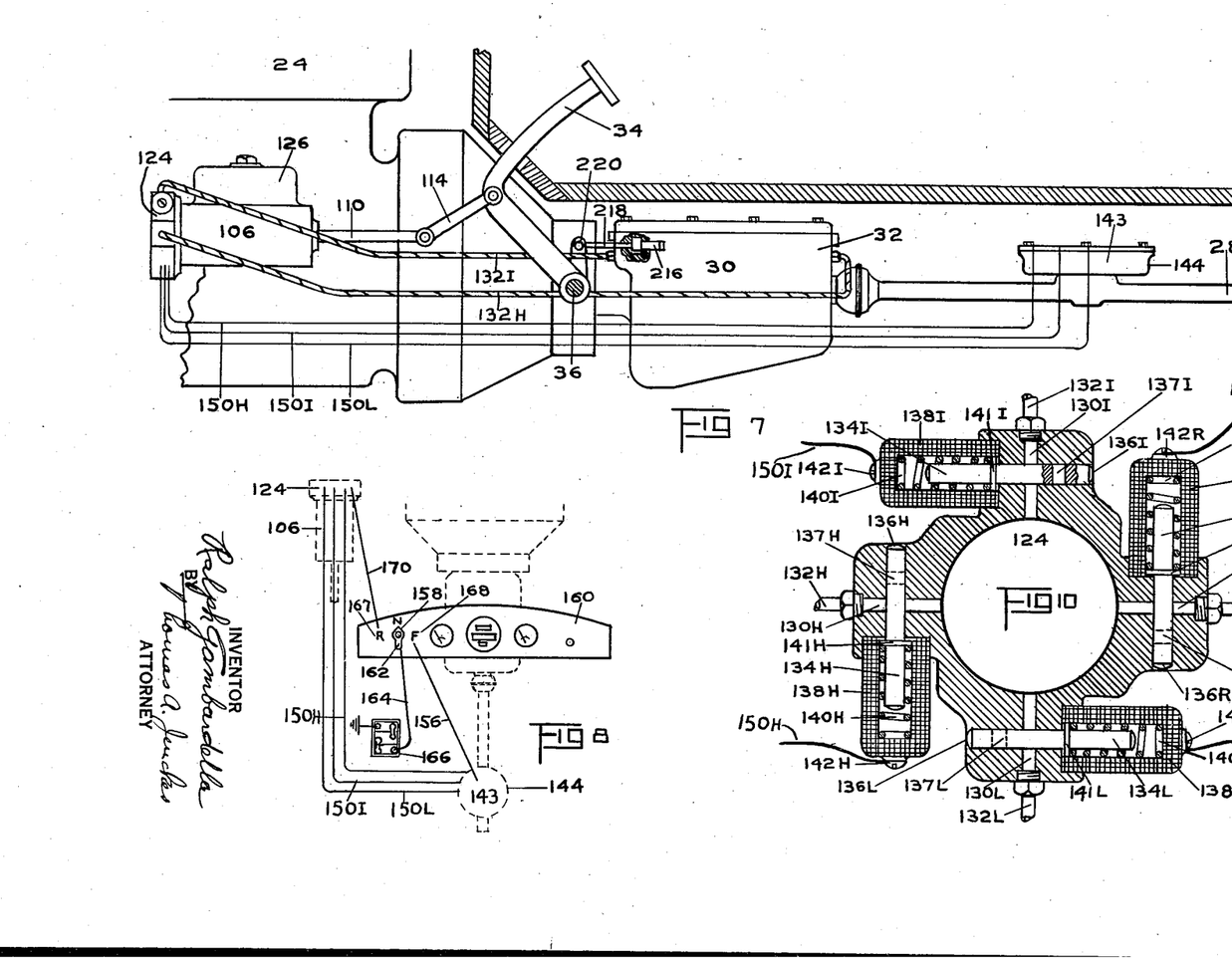
Fig. 7 is a skeleton side elevational view taken sectionally longitudinally of the vehicle and illustrating the foot pedal, the master hydraulic cylinder and master valve and hydraulic means for actuating the shifter forks of the transmission, the improved type of governor I preferably employ having a portion responsive to the speed of the drive shaft to selectively control the rods of the hydraulic valve electrically and additionally showing the means I employ to permit shifting of the shifter fork to neutral position on the reactuation of the foot pedal.
Fig. 8 is a diagrammatic view illustrating the electrical connections of my improved invention.
Fig. 10 is a sectional view through the master valve taken along the line 10—10 of Fig. 9.
Figure 11:
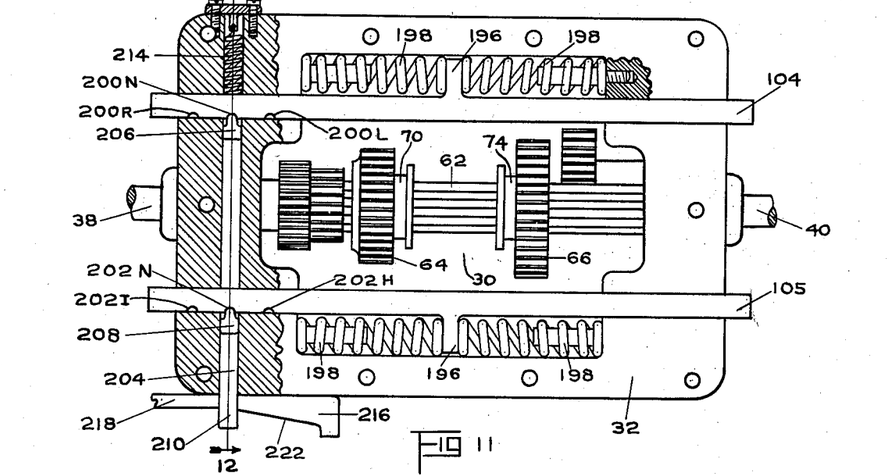
Fig. 11 is a horizontal sectional view taken along the line 11—11 of Fig. 3 through the transmission housing and illustrating the preferred type of means I employ to automatically permit the shifting of the respective actuated shifter fork to neutral position at the commencement of the reactuation of the foot pedal.

I have shown in Figs. 2, 3 and 11 a standard type of shiftable selective speed gearing. The usual drive shaft is broken into the front portion 38 and rear portion 40 each of which project into the housing and are rotatably mounted on the ball bearings 42 therein. A supplemental shaft 44 extends longitudinally of the lower portion of the housing 32 and has the drive gear 46 mounted on the front end thereof and an intermediate speed gear 48 at a spaced distance behind it and at a spaced distance behind said gear 48 the low speed gear 50 and at a spaced distance behind the low speed gear 50 the reverse gear 52 adapted to actuate the supplemental reverse idler gear 54 mounted on the supplemental stub shaft 56. The rear end of the front portion 38 has the drive gear 58 mounted thereon adapted to continuously drive the gear 46 and hence shaft 44 and projecting inwardly therefrom the high speed clutch element 60. The front portion of the rear portion 40 of the drive shaft within the housing is fluted as at 62 and has the longitudinally slidable high speed and intermediate speed shifter gear 64 mounted on the front end thereof and the longitudinally shiftable low and reverse speed shifter gear 66 mounted on the rear portion thereof. The shifter gears 64 and 66 are splined as at 68 as shown in Fig. 4 to rotatably cooperate with the flutes 62 on the rear drive portion 40 to positively drive it. The front shifter gear 64 has the annular extension 70 projecting rearwardly therefrom terminating in the flange 72 and the rear shifter gear 66 has the corresponding extension 74 projecting forwardly therefrom and terminating in the flange 76 projecting outwardly therefrom to provide respective annular channels between the walls of said gears and said flanges 72 and 76 to receive the fork projections 78 of each shifter fork 80 and 82 respectively. The front shifter gear 64 is provided with internal teeth 84 to receive the external teeth on the clutch element 60 to provide a high speed direct connection between the front portion 38 and rear portion 40 of the drive shaft when the shifter gear 64 is moved to its forward position on slidable actuation of the shifter fork 80. When the shifter fork 80 is moved to a rear position, it is obvious that the front shifter gear 64 will be moved into mesh with the intermediate speed drive gear 48 to transmit the movement of the front drive shaft portion 38 through the gear 58, gear 46 on shaft 44, intermediate speed gear 48, shifter gear 64, splines 68 and flutes 62 to the rear drive shaft portion 40. When the other shifter fork 82 is moved to forward position, it is obvious that it will bring the rear shifter gear 66 into mesh with the low speed drive gear 50 on the shaft 44 to impart forward drive movement to the rear drive shaft portion 40 through the medium of the gear 58, drive gear 46 on shaft 44, low speed gear 50 thereon, rear shifter gear 66, internal splines 68 thereon and flutes 62 to the rear drive shaft portion 40. When the shifter fork 82 is moved rearwardly, it is obvious that it will bring the rear shifter gear 66 into mesh with the reverse idler gear 54 to cause rotation of the front shaft portion 38 to actuate the gear 58 thereon to revolve the gear 46 on the shaft 44 to rotate the reverse gear 52 thereon to impart through the medium of the idler gear 54 on the stub shaft 56 a reverse rotative movement of the rear shifter gear 66 to impart through the medium of the internal splines 68 actuating the flutes 62 on the rear drive shaft portion 40 to rotate said drive shaft portion 40 in a reverse direction. The shifter forks 80 and 82 are provided with the intermediate longitudinally extending rods 85 and 86 respectively longitudinally adjustable in holes 88 therein by means of the set screws 90 in the collars 92 formed therefor in said shifter forks 80 and 82 respectively. The shifter fork 80 to actuate the front shifter gear 64 is thus provided with a rod 85 terminating in a front end 94 and a rear end 96 and the shifter fork 82 to actuate the rear shifter gear 66 is provided with a similar longitudinally extending rod 86 terminating in a front end 98 and a rear end 100. The shifter forks 80 and 82 are provided with extensions 102 projecting upwardly from said collars 92 and which as shown are integrally attached to square shafts 104 and 105 having the ends thereof longitudinally slidably mounted in the front and rear walls of the transmission housing 32 for a purpose to be later described.

In the preferred embodiment of my invention, I provide hydraulic means to perform the actual work of shifting the respective shifting gears 64 and 66 and for this purpose I provide a master hydraulic cylinder 106 mounted in front of the clutch pedal 34 having the piston 108 longitudinally slidable therein, having the piston rod 110 projecting rearwardly therefrom through the stuffing box 112 and having the end thereof connected by means of the link 114 to the foot pedal 34. I also mount in said transmission casing opposite the respective ends of the rods 85 and 86 of the shifter forks 80 and 82 the respective actuating hydraulic cylinders 116H, 116I, 116R and 116L, said cylinders being respectively provided with the respective pistons 118H, 118I, 118R and 118L respectively having the piston rods 120 projecting therefrom inwardly of said housing and terminating in the respective enlarged ends 122H, 122I, 122R and 122L respectively opposite the ends 96 and 94 of the shifter rod 85 of the shifter rod 80 and the ends 100 and 98 of the rod 86 of the shifter fork 82. Said pistons 118H, 118I, and 118R and 118L are normally urged inwardly of the cylinders by the respective springs 124H, 124I, 124R and 124L to exhaust liquid therefrom and to retract the ends 122 of the piston rods 120 therein.

To selectively control the supply of fluid to the hydraulic cylinders 116H, 116I, 116R and 116L from the master hydraulic cylinder 106 I provide a master valve 124 located at the front end of said master hydraulic cylinder 106. Said master hydraulic cylinder 106 may also be provided with the oil storage reservoir 126 mounted on the top thereof to maintain a constant supply of liquid through the medium of the hole 128 in the master hydraulic cylinder 106 below it. Said master valve 124 includes the four discharge ports 130H, 130I, 130R and 130L projecting radially outwardly in suitable extensions on the front end of the master cylinder 106, each respectively connected to its respective actuating cylinder 116H, 116I, 116R and 116L by means of the pipes 132 and four rods 134H, 134I, 134R and 134L laterally movable in channels 136H, 136I, 136R and 136L extending across said discharge ports 130H, 130I, 130R and 130L. The respective rods in the embodiment shown are provided with the holes 137H, 137I, 137R and 137L extending diametrically therethrough adapted to be brought in register with a selected port 130H, 130I, 130R or 130L to permit discharge of fluid from the master hydraulic cylinder therethrough to the selected actuating cylinder 116H, 116I, 116R or 116L to respectively actuate its respective shifter fork in the proper direction to change the gearing. To control the selected movement of the desired rod, I preferably mount four solenoids 138H, 138I, 138R and 138L on its respective extension to draw its respective rod 134H, 134I, 134R or 134L outwards to bring its respective hole 137H, 137I, 137R or 137L into alignment with its respective discharge port 130H, 130I, 130R or 130L. Each respective solenoid is provided with a spring 140H, 140I, 140R or 140L internally thereof to contact a suitable washer 141 in its respective rod to normally urge the rod to a position cutting off its respective discharge port 130. A contact post 142H, 142I, 142R or 142L is mounted on a respective end of each respective solenoid.

I provide switch means 143 comprising contact portions individually connected to a selected solenoid in said master valve and governor means rotatably responsive to the speed of said drive shaft 26 to selectively complete a circuit through one of said respective contact portions proportionate to the speed of said drive shaft to actuate a respective valve rod 134 to open a selected port 130 to permit discharge of fluid from said master hydraulic cylinder on depression of said foot pedal to selectively shift a gear proportionate to the speed of the drive shaft, thus broadly, means preferably electrically controlled by the speed of said drive shaft to select the proper element for proper directional movement of the proper shifting fork to shift the proper gear, preferably through hydraulic means, on movement of said foot pedal suitable for the then speed of said drive shaft, in my preferred embodiment shown, said switch means comprising a cylindrical housing 144, a disc 146 mounted in the upper end of said housing having a central circular contact portion 148L electrically connected to the low speed shifting rod solenoid 138L by means of the wire 150L, a concentric annular contact portion 148I electrically connected to the intermediate speed shifting rod solenoid 138I by means of the wire 150I and a concentric larger annular portion 148H electrically connected to the high speed shifting rod solenoid 138H by the wire 150H, said circular contact disc 148L and annular contacting discs 148I and 148H being suitably insulated from each other by the insulating rings 152. The circular contact disc 154 is mounted in the lower portion of the said flat cylindrical housing and is suitably electrically connected by the wire 156 to the forward contact 168 also labeled F of the supplemental switch 158 which may be suitably mounted on the instrument panel 160 of the vehicle. Said switch 158 includes a movable element 162 continuously connected by the means of the wire 164 to the storage battery 166 and the reverse contact 167 also labeled R connected by the wire 170 to the solenoid binding post 142R and the forward contact 168 also labeled F connected by the wire 156 to the lower disc 154 of said switch 143. I also provide in said switch 143 governor means including the plate 174 mounted to revolve within said housing on a stub shaft 176 projecting upwardly through said disc 154 and having a bevel gear 178 on the lower end thereof adapted to be driven by a bevel gear 180 on said drive shaft 26 to cause rotation of said plate 174 in proportion to the speed of said drive shaft. Said plate 174 is provided with the slots 184 projecting arcuately generally radially outwardly thereof. I also provide the arms 186 pivotally mounted as at 188 on the flange 190 projecting integrally upwardly from the outer periphery of the plate 174, said arms thus extending inwardly radially of said housing 144. The vertically extending contact pins 192 are mounted on the inner ends of the arms 186 to contact said upper and lower discs 146 and 154 respectively adapted to selectively pass electric current therethrough from the lower disc 154 through the selective portions 148L, 148I and 148H of the upper disc 146 depending on the radial position of said contact pins 192 on said upper disc 146. Said pins 192 thus pivot outwardly in said slots 184 on said arms 186 on rotation of said plate 174 in proportion to the speed of the drive shaft 26. I also provide the spring means 194 connected to said flange 190 and arms 186 to normally urge said contact pins inwardly radially of said slots 184 in contact with the low speed disc 148L to always select the low speed shifting element when the vehicle is not in motion.

Figures 9, 13:
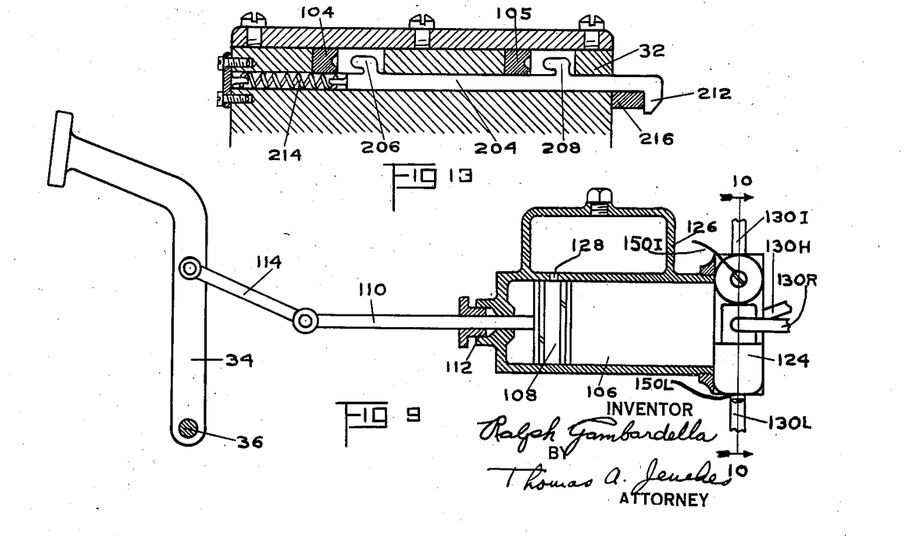
Fig. 9 is a diagrammatic side elevation partially shown in section of the foot pedal, my improved master hydraulic cylinder and master valve.
Fig. 13 is a sectional view similar to Fig. 12 with the locking rod forced outwardly by the clutch pedal attachment to permit the shifter fork to be returned to a neutral position.
Figure 12:
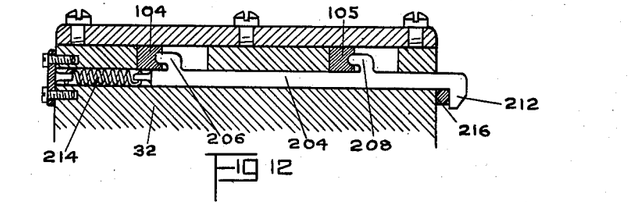
Fig. 12 is a cross sectional view taken along the line 12—12 of Fig. 11 showing the transversely slidable locking rod retaining a shifter fork in position to permit actuation of said drive shaft by a selected gear.
Figure 14:
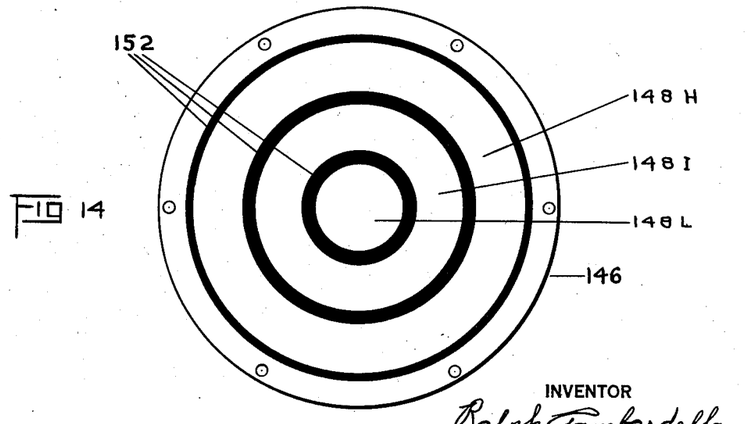
Fig. 14 is a reverse plan view of the contact disc cover of my improved electrical switch means for selecting the proper gear shifting element to shift the gear on movement of the foot pedal suitable for the then speed of the drive shaft.
Figure 15:
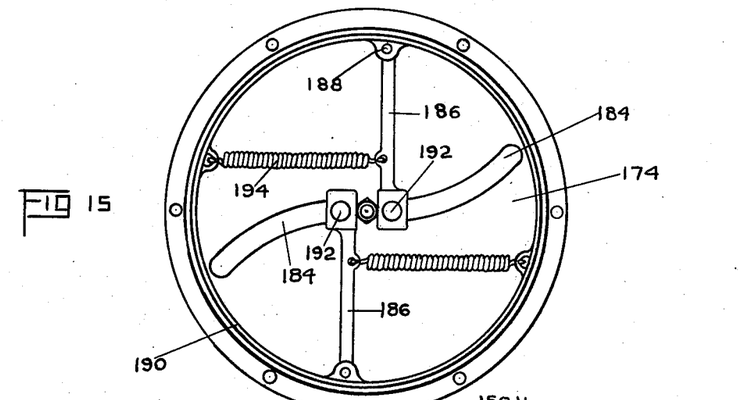
Fig. 15 is a plan view of my improved switch with the cover disc shown in Fig. 14 removed.
Figure 16:
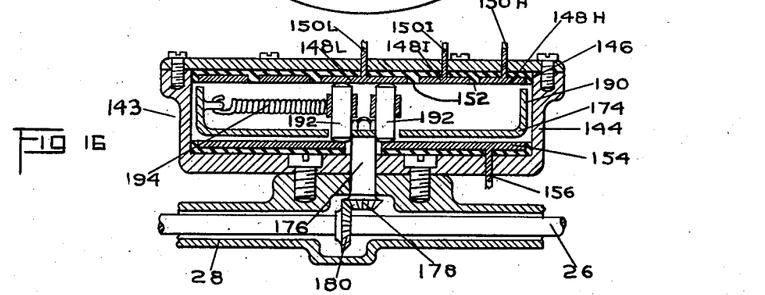
Fig. 16 is a vertical sectional view taken through my improved switch shown in Fig. 15 with the cover shown in Fig. 14 also attached and adjacent portions of the drive shaft.

I also provide means also connected to the foot pedal 34 to permit movement of said actuated shifter fork to neutral position on another depression of said foot pedal 34. In my preferred embodiment said means includes square shafts 104 and 105 longitudinally mounted as shown in Figs. 11–13 in said transmission gear housing 32 to longitudinally slide therein on movement of said shifter forks 80 and 82, said square shafts 104 and 105 having the lug means 196 projecting laterally substantially centrally thereof. Spring means 198 of substantially equal power are mounted within said housing 32 to abut the opposite sides of said lug means to normally urge said shafts 104 and 105 and connected shifter forks 80 and 82 to a neutral position as shown in Fig. 3. The front end of each shaft 104 and 105 is provided with three lateral notches, the rod 104 with the rear notch 200L, the front notch 200R and the center notch 200N and the front end of said shaft 105 is provided with the three lateral notches, namely, the front notch 202I, the rear notch 200H and the center notch 200N. A locking rod 204 is transversely slidably mounted in the front end of said housing 32 having lug means 206 projecting inwardly therefrom near the inner end thereof adjacent the shaft 104 and lug means 208 projecting inwardly therefrom adjacent the shaft 105. It is thus obvious that one of the lug means 206 and 208 is adapted to be selectively inserted in its respective notch 200H, 200I or 200N, or 202L, 202R or 202N. The outer end of the rod means terminates in the end 210 projecting outwardly from said housing 32 and bent at right angles thereto as at 212 exterior of said housing 32. I provide the pull spring means 214 having its inner end attached to the housing and its outer end attached to the inner end of the rod 204 to normally urge said rod 204 inwards to bring its respective lug means 206 or 208 into respective contact with the desired lateral notch hitherto described. I also provide a wedge 216 longitudinally slidable laterally of said housing 32 and connected by the integral rod 218 to an arm 220 projecting upwardly from the clutch pedal shaft 36. Said wedge 216 has an outer surface 222 inclined outwardly towards the rear thereof to urge the more outwardly inclined rear end thereof forwardly on depression of the foot pedal to abut the end 212 of said rod 204 to move it outwardly to bring its respective lug means 206 or 208 out of engagement with its respective notch in said longitudinally slidable shaft means 104 or 105 to permit the spring means 198 to move said rod 104 or 105 and connected shifter fork 80 or 82 to neutral position. It is thus apparent that as each respective shifter rod 80 or 82 is urged in its respective direction to shift its respective shifting gear 64 or 66 by the hydraulic means hitherto described, that when said shifter gear 64 or 66 has become enmeshed with its desired gear that the spring 214 will urge the locking rod 210 inwardly to permit the proper lug means 206 or 208 thereof to engage in the proper notch in the shaft means 104 or 105, the respective springs 198 compressing under the action of the more powerful hydraulic means for this purpose and permanently holding the shaft means 104 or 105 to hold its respective gear in mesh during the operation of the vehicle. It is obvious, however, that as the foot pedal is again depressed the inclined wedge 216 will function on partial depression of said foot pedal to move the rod 210 outwardly against the action of the spring 214 to permit the respective spring means 198 to center its respective lug means 196 and connected respective shaft 104 or 105 and connected respective shifter fork 80 or 82 to neutral position.

It is thus obvious that the motive power for actuating the hydraulic means is supplied entirely by depression of the clutch pedal 34 which, as explained, is directly connected to the piston 108 by the link 114. The piston 108 pushes the liquid in the cylinder 106 forward and out through the respective open port 130R, 130L, 130I or 130H. The supplemental switch 158 and also the governor 143 for forward speeds control the operation of the solenoid rods 134R, 134L, 134I and 134H to select which respective port 130R, 130L, 130I or 130H is open. If it be desired to employ the reverse speed, the movable element 162 of the supplemental switch 158 is brought opposite the reverse contact 167 also labeled R to conduct electricity from the storage battery 166 through the wire 164, through the movable element 162 connected thereto, through the contact 167 also labeled R, through the wire 170 connected to said contact 167 to solenoid 138R to set up current therein to withdraw the respective solenoid rod 134R to permit the hole 137R to come in alignment with the port 130R so that, on depression of the clutch pedal 32, liquid will be forced out from the hydraulic cylinder 106 through the master valve 124, port 130R into the respective cylinder 118R to force the piston 118R inwards to cause its respective piston rod 120R to abut the end 98 of the shifter fork 82 to shift the shifter gear 66 into contact with the reverse gear 54 to cause reverse movement of the vehicle. When, however, the movable element 162 of the supplemental switch 158 is moved opposite the forward contact 168 also labeled F of said supplemental switch 158, current will pass from the storage battery 166 through the wire 164 through the movable element 162, through the forward contact 168, through the wire 156 to the circular contact disk 154 of the main selective switch means 143, which in turn functions in the manner explained to form a circuit through its respective disk 148L, 148I or 148H to open the respective port 130L, 130I or 130H to cause liquid to flow therethrough on actuation of the clutch pedal 32 in the manner hitherto explained into the respective cylinder 116L, 116I and 116H to automatically shift the gears on depression of the clutch pedal in accordance with the forward speed of the vehicle automatically selected by the main switch 143. It is thus apparent that as the clutch is engaged the shifter rods 122 are returned to their inoperative position under the action of the springs 124, which action forces fluid back into the master cylinder. During this operation the shift rails 104 and 105 are locked in their respective positions by detents 206 and 208.

It is apparent therefore that I have provided a novel type of gear shifting mechanism which is semi-automatic and positive in its action, to be under the control of the operator of the vehicle at all times and dependent on him for the actual actuation thereof to shift gears by depression of the foot pedal, the proper gear being automatically selected by the rotative speed of the drive shaft of the vehicle.

It is also apparent that I have provided a device of this description constructed of a small number of relatively simple parts at all times positive in their action and with the other advantages described above.

It is understood that my invention is not limited to the specific embodiment shown and that various deviations may be made therefrom without departing from the spirit and scope of the appended claims.

What I claim is:

1. In a gear shifting device for vehicles having a motor, a drive shaft, shiftable selective speed gearing connecting said motor and drive shaft, and a clutch pedal to disengage said motor and drive shaft during selective changing of said gearing, a master hydraulic cylinder having a piston operatively connected to said clutch pedal, two gear shifting forks each operatively connected to the gearing to be capable of movement in opposite directions to selectively shift the gearing, four actuating hydraulic cylinders each operatively connected to a shifting fork to respectively actuate said shifting forks in opposite directions, a master valve comprising four discharge ports from said hydraulic cylinder respectively hydraulically connected to each respective hydraulic actuating cylinder, four rods normally closing said ports, and four solenoids each operatively connected to a rod and each being selectively capable on actuation thereof to move a rod to selectively open a port, switch means comprising contact portions individually connected to a selected solenoid in said master valve, and governor means operatively connected to said drive shaft to be rotatably responsive to the speed of said drive shaft operatively connectable to a respective contact portion to selectively complete a circuit through said respective contact portion proportionate to the speed of said drive shaft to actuate a respective valve rod to open a selected port to permit discharge of fluid from said master hydraulic cylinder on depression of said clutch pedal to selectively shift the gearing proportionately to the speed of the drive shaft, means associated with said shifting forks to retain said selected gear in mesh and means connected to said clutch pedal to permit movement of said actuated shifting fork to neutral position at the start of another actuation of said clutch pedal.

2. In a gear shifting device for vehicles having a motor, a drive shaft, shiftable selective speed gearing connecting said motor and drive shaft, and a clutch pedal to disengage said motor and drive shaft during selective changing of said gearing, a master hydraulic cylinder having a piston operatively connected to said clutch pedal, two gear shifting forks each operatively connected to the gearing to be capable of movement in opposite directions to selectively shift the gearing, four actuating hydraulic cylinders each operatively connected to a shifting fork to respectively actuate said shifting forks in opposite directions, a master valve comprising four discharge ports from said hydraulic cylinder respectively hydraulically connected to each respective hydraulic actuating cylinder, four rods normally closing said ports, and four solenoids each operatively connected to a rod and each being selectively capable on actuation thereof to move a rod to selectively open a port, switch means comprising contact portions individually connected to a selected solenoid in said master valve, and governor means operatively connected to said drive shaft to be rotatably responsive to the speed of said drive shaft connectable to a respective contact portion to selectively complete a circuit through a respective contact portion proportionate to the speed of said drive shaft to actuate a respective valve rod to open a selected port to permit discharge of fluid from said master hydraulic cylinder on depression of said clutch pedal to selectively shift the gearing proportionate to the speed of the drive shaft and means associated with said shifting forks to retain said selected gear in mesh.

3. In a gear shifting device for vehicles having a motor, a drive shaft, shiftable selective speed gearing connecting said motor and drive shaft, and a clutch pedal to disengage said motor and drive shaft during selective changing of said gearing, a master hydraulic cylinder having a piston operatively connected to said clutch pedal, two gear shifting forks each operatively connected to the gearing to be capable of movement in opposite directions to selectively shift the gearing, four actuating hydraulic cylinders each operatively connected to a shifting fork to respectively actuate said shifting forks in opposite directions, a master valve comprising four discharge ports from said hydraulic cylinder respectively hydraulically connected to each respective hydraulic actuating cylinder, four rods normally closing said ports, and four solenoids each operatively connected to a rod and each being selectively capable on actuation thereof to move a rod to selectively open a port, switch means to electrically energize a respective solenoid to automatically actuate a respective valve rod to open a selected port to permit discharge of fluid from said master hydraulic cylinder on depression of said clutch pedal to selectively shift the gearing proportionate to the speed of the drive shaft, means associated with said shifting forks to retain said selected gear in mesh and means connected to said clutch pedal to permit movement of said actuated shifting fork to neutral position at the start of another actuation of said clutch pedal.

4. In a gear shifting device for vehicles having a motor, a drive shaft, shiftable selective speed gearing connecting said motor and drive shaft, and a clutch pedal to disengage said motor and drive shaft during selective changing of said gearing, a master hydraulic cylinder having a piston operatively connected to said clutch pedal, two gear shifting forks each operatively connected to the gearing to be capable of movement in opposite directions to selectively shift the gearing, four actuating hydraulic cylinders each operatively connected to a shifting fork to respectively actuate said shifting forks in opposite directions, a master valve comprising four discharge ports from said hydraulic cylinder respectively hydraulically connected to each respective hydraulic actuating cylinder, four rods normally closing said ports, and four solenoids each operatively connected to a rod and each being selectively capable on actuation thereof to move a rod to selectively open a port, switch means to electrically energize a respective solenoid, to automatically actuate a respective valve rod to open a selected port to permit discharge of fluid from said master hydraulic cylinder on depression of said clutch pedal to selectively shift the gearing proportionate to the speed of the drive shaft and means associated with said shifting forks to retain said selected gear in mesh.

5. In a gear shifting device for vehicles having a motor, a drive shaft, shiftable selective speed gearing connecting said motor and drive shaft, and a clutch pedal to disengage said motor and drive shaft during selective changing of said gearing, two gear shifting forks, each operatively connected to the gearing to be capable of movement in opposite directions to selectively shift the gearing, hydraulically actuated means operatively connected to said clutch pedal and shifting forks actuatable by depression of said clutch pedal to selectively operate a selected shifting fork in a selected direction to selectively change the gearing, electrical means operatively connected to said hydraulically actuated means and said drive shaft automatically controlled by the speed of said drive shaft to select the proper directional movement of the proper shifting fork to shift the gearing on movement of said cutch pedal, suitable for the then speed of said drive shaft and means connected to said clutch pedal to permit movement of said actuated shifting fork to neutral position at the start of another actuation of said clutch pedal.

6. In a gear shifting device for vehicles having a motor, a drive shaft, shiftable selective speed gearing connecting said motor and drive shaft, and a clutch pedal to disengage said motor and drive shaft during selective changing of said gearing, two gear shifting forks, each operatively connected to the gearing to be capable of movement in opposite directions to selectively shift the gearing, hydraulically actuated means operatively connected to said clutch pedal and shifting forks actuatable by depression of said clutch pedal to selectively operate a selected shifting fork in a selected direction to selectively change the gearing, and electrical means operatively connected to said hydraulically actuated means automatically controlled by the speed of said drive shaft to select the proper directional movement of the proper shifting fork to shift the gearing on movement of said clutch pedal, suitable for the then speed of said drive shaft and means connected to said clutch pedal operable on initiation of said movement of said clutch pedal to release a shifting fork to unmesh the gearing whereby a single movement of the clutch pedal alone may effect a complete change of gearing.

7. In a gear shifting device for vehicles having a motor, a drive shaft, shiftable selective speed gearing connecting said motor and drive shaft, and a clutch pedal to disengage said motor and drive shaft during selective changing of said gearing, a master hydraulic cylinder having a piston operatively connected to said clutch pedal, two gear shifting forks operatively connected to the gearing to be each capable of movement in opposite directions to selectively shift the gearing, one, so connected as to be capable of connecting reverse and low speeds on movement in opposite directions, and the other so connected as to be capable of connecting intermediate and high speeds on movement in opposite directions, four actuating hydraulic cylinders each operatively connected to a respective shifting fork to respectively actuate said shifting forks in opposite directions, a master valve comprising four discharge ports from said hydraulic cylinder respectively hydraulically connected to each respective hydraulic actuating cylinder, four rods normally closing said ports, and four solenoids each operatively connected to a respective rod to be selectively capable on actuation thereof to move a rod to selectively open a port, switch means comprising contact portions individually connected to a selected solenoid in said master valve, and governor means operatively connected to the drive shaft to be rotatably responsive to the speed of said drive shaft connectable to a respective contact portion to selectively complete a circuit through a respective contact portion proportionate to the speed of said drive shaft to actuate a respective valve rod to open a selected port to permit discharge of fluid from said master hydraulic cylinder on depression of said clutch pedal to selectively shift the gearing proportionate to the speed of the drive shaft, means associated with said shifting forks to retain said selected gear in mesh and supplemental manually operated switch means operable to control selection of reverse speed on actuation of said clutch pedal, and means connected to said clutch pedal to permit movement of said actuated shifting fork to neutral position at the start of another actuation of said clutch pedal.

8. In a gear shifting device for vehicles having a motor, a drive shaft, shiftable selective speed gearing connecting said motor and drive shaft and a clutch pedal to disengage said motor and drive shaft during selective changing of said gearing, a master hydraulic cylinder having a piston operatively connected to said clutch pedal, two gear shifting forks each operatively connected to the gearing to be capable of movement in opposite directions to selectively shift the gearing, one, so connected as to be capable of connecting reverse and low speeds on movement in opposite directions, and the other so connected as to be capable of connecting intermediate and high speeds on movement in opposite directions, four actuating hydraulic cylinders each operatively connected to a respective shifting fork to respectively actuate said shifting forks in opposite directions, a master valve comprising four discharge ports from said hydraulic cylinder respectively hydraulically connected to each respective hydraulic actuating cylinder, four rods normally closing said ports, and four solenoids each operatively connected to a rod and each being selectively capable on actuation thereof to move a rod to selectively open a port, switch means comprising contact portions individually connected to a selected solenoid in said master valve, and governor means operatively connected to said drive shaft to be rotatably responsive to the speed of said drive shaft connectable to a respective contact portion to selectively complete a circuit through a respective contact portion proportionate to the speed of said drive shaft to actuate a respective valve rod to open a selected port to permit discharge of fluid from said master hydraulic cylinder on depression of said clutch pedal to selectively shift the gearing proportionate to the speed of the drive shaft, means associated with said shifting forks to retain said selected gear in mesh, and supplemental manually operated switch means operable to control selection of reverse speed on actuation of said clutch pedal.

9. In a gear shifting device for vehicles having a motor, a drive shaft, shiftable selective speed gearing connecting said motor and drive shaft, and a clutch pedal to disengage said motor and drive shaft during selective changing of said gearing, a master hydraulic cylinder having a piston operatively connected to said clutch pedal, two gear shifting forks each operatively connected to the gearing to be capable of movement in opposite directions to selectively shift the gearing, four actuating hydraulic cylinders each operatively connected to a shifting fork to respectively actuate said shifting forks in opposite directions, a master valve comprising four discharge ports from said hydraulic cylinder hydraulically connected to each respective hydraulic actuating cylinder, four rods normally closing said ports, and four solenoids each operatively connected to a rod and each being selectively capable on actuation thereof to move a rod to selectively open a port, switch means comprising a housing, a disc mounted on one end of said housing having a central circular contact portion electrically connected to the low speed shifting rod solenoid, a concentric annular contact portion electrically connected to the intermediate speed shifting rod solenoid, and a concentric larger annular portion electrically connected to the high speed shifting rod solenoid, and a contact disc mounted on the other end thereof and governor means comprising a plate operatively connected to the drive shaft to be rotatably driven by said drive shaft having slots extending arcuately radially outwardly thereof, arms pivotally mounted on the periphery thereof to extend inwardly radially thereof having vertically extending contact pins contacting said discs mounted on the inner ends thereof, to pivot outwardly in said slots on said arms on rotation of said plate in proportion to the speed of said drive shaft and spring means normally urging said contact pins inwardly, whereby said pins may complete a circuit to actuate a respective valve rod to open a selected port to permit discharge of fluid from said master hydraulic cylinder on depression of said clutch pedal to selectively shift the gearing proportionate to the speed of the drive shaft, means associated with said shifting forks to retain said selected gear in mesh and means connected to said clutch pedal to permit movement of said actuated shifting fork to neutral position at the start of another actuation of said clutch pedal.

10. In a gear shifting device for vehicles having a motor, a drive shaft, shiftable selective speed gearing connecting said motor and drive shaft, a clutch pedal to disengage said motor and drive shaft during selective changing of said gearing, a master hydraulic cylinder having a piston operatively connected to said clutch pedal, two gear shifting forks each operatively connected to the gearing to be each capable of movement in opposite directions to selectively shift the gearing, four actuating hydraulic cylinders each operatively connected to a shifting fork to respectively actuate said shifting forks in opposite directions, a master valve comprising four discharge ports from said hydraulic cylinder respectively hydraulically connected to each respective hydraulic actuating cylinder, four rods normally closing said ports, and four solenoids each operatively connected to a rod and each being selectively capable on actuation thereof to move a rod to selectively open a port, switch means comprising a housing, a disc mounted on one end of said housing having a central circular contact portion electrically connected to the low speed shifting rod solenoid, a concentric annular contact portion electrically connected to the intermediate speed shifting rod solenoid, and a concentric larger annular portion electrically connected to the high speed shifting rod solenoid, and a contact disc mounted on the other end thereof and governor means comprising a plate operatively connected to the drive shaft to be rotatably driven by said drive shaft having slots extending arcuately radially outwardly thereof, arms pivotally mounted on the periphery thereof to extend inwardly radially thereof having vertically extending contact pins contacting said discs mounted on the inner ends thereof, to pivot outwardly in said slots on said arms on rotation of said plate in proportion to the speed of said drive shaft and spring means normally urging said contact pins inwardly, whereby said pins may complete a circuit to actuate a respective valve rod to open a selected port to permit discharge of fluid from said master hydraulic cylinder on depression of said clutch pedal to selectively shift the gearing proportionate to the speed of the drive shaft and means associated with said shifting forks to retain said selected gear in mesh.

11. In a gear shifting device for vehicles having a motor, a drive shaft, shiftable selective speed gearing connecting said motor and drive shaft, and a clutch pedal to disengage said motor and drive shaft during selective changing of said gearing, a master hydraulic cylinder having a piston operatively connected to said clutch pedal, two gear shifting forks operatively connected to the gearing to be each capable of movement in opposite directions to selectively shift the gearing, one, being so connected to be capable of connecting reverse and low speeds on movement in opposite directions, and the other being so connected to be capable of connecting intermediate and high speeds on movement in opposite directions, four actuating hydraulic cylinders each operatively connected to a respective shifting fork to respectively actuate said shifting forks in opposite directions, a master valve comprising four discharge ports from said hydraulic cylinder hydraulically connected to each respective hydraulic actuating cylinder, four rods normally closing said ports, and four solenoids each operatively connected to a rod and each being selectively capable on actuation thereof to move a rod to selectively open a port, switch means comprising a housing, a disc mounted on one end of said housing having a central circular contact portion electrically connected to the low speed shifting rod solenoid, a concentric annular contact portion electrically connected to the intermediate speed shifting rod solenoid, and a concentric larger annular portion electrically connected to the high speed shifting rod solenoid, and a contact disc mounted on the other end thereof and governor means comprising a plate operatively connected to the drive shaft to be rotatably driven by said drive shaft having slots extending arcuately radially outwardly thereof, arms pivotally mounted on the periphery thereof to extend inwardly radially thereof having vertically extending contact pins contacting said discs mounted on the inner ends thereof, to pivot outwardly in said slots on said arms on rotation of said plate in proportion to the speed of said drive shaft and spring means normally urging said contact pins inwardly whereby said pins may complete a circuit to actuate a respective valve rod to open a selected port to permit discharge of fluid from said master hydraulic cylinder on depression of said clutch pedal to selectively shift the gearing proportionate to the speed of the drive shaft, supplemental manually operated switch means operable to control selection of reverse speed on actuation of said clutch pedal, means associated with said shifting forks to retain said selected gear in mesh and means connected to said clutch pedal to permit movement of said actuated shifter fork to neutral position at the start of another actuation of said clutch pedal.

12. In a gear shifting device for vehicles having a motor, a drive shaft, shiftable selective speed gearing connecting said motor and drive shaft, and a clutch pedal to disengage said motor and drive shaft during selective changing of said gearing, a master hydraulic cylinder having a piston operatively connected to said clutch pedal, two gear shifting forks operatively connected to the gearing to be each capable of movement in opposite directions to selectively shift the gearing, one, being so connected to be capable of connecting reverse and low speeds on movement in opposite directions, and the other being so connected to be capable of connecting intermediate and high speeds on movement in opposite directions, four actuating hydraulic cylinders each operatively connected to a respective shifting fork to respectively actuate said shifting forks in opposite directions, a master valve comprising four discharge ports from said hydraulic cylinder hydraulically connected to each respective hydraulic actuating cylinder, four rods normally closing said ports, and four solenoids each operatively connected to a rod and each being selectively capable on actuation thereof to move a rod to selectively open a port, switch means comprising a housing, a disc mounted on one end of said housing having a central circular contact portion electrically connected to the low speed shifting rod solenoid, a concentric annular contact portion electrically connected to the intermediate speed shifting rod solenoid, and a concentric larger annular portion electrically connected to the high speed shifting rod solenoid, and a contact disc mounted on the other end thereof and governor means comprising a plate operatively connected to the drive shaft to be rotatably driven by said drive shaft having slots extending arcuately radially outwardly thereof, arms pivotally mounted on the periphery thereof to extend inwardly radially thereof having vertically extending contact pins contacting said discs mounted on the inner ends thereof, to pivot outwardly in said slots on said arms on rotation of said plate in proportion to the speed of said drive shaft and spring means normally urging said contact pins inwardly whereby said pins may complete a circuit to actuate a respective valve rod to open a selected port to permit discharge of fluid from said master hydraulic cylinder on depression of said clutch pedal to selectively shift the gearing proportionate to the speed of the drive shaft, and supplemental manually operated switch means operable to control selection of reverse speed on actuation of said clutch pedal, and means associated with said shifting forks to retain said selected gear in mesh.

13. In a gear shifting device for vehicles having a motor, a drive shaft, shiftable selective speed gearing connecting said motor and drive shaft, and a clutch pedal to disengage said motor and drive shaft during selective changing of said gearing, a master hydraulic cylinder having a piston operatively connected to said clutch pedal, two gear shifting forks each operatively connected to the gearing to be capable of movement in opposite directions to selectively shift the gearing, four actuating hydraulic cylinders each operatively connected to a shifting fork to respectively actuate said shifting forks in opposite directions, a master valve comprising four discharge ports from said hydraulic cylinder respectively hydraulically connected to each respective hydraulic actuating cylinder, four rods normally closing said ports, and means connected to each rod to actuate a respective valve rod to open a selected port to permit discharge of fluid from said master hydraulic cylinder on depression of said clutch pedal to selectively shift the gearing proportionate to the speed of the drive shaft, means associated with said shifting forks to retain said selected gear in mesh and means connected to said clutch pedal to permit movement of said actuated shifting fork to neutral position at the start of another actuation of said clutch pedal.

14. In a gear shifting device for vehicles having a motor, a drive shaft, shiftable selective speed gearing connecting said motor and drive shaft, and a clutch pedal to disengage said motor and drive shaft during selective changing of said gearing, a master hydraulic cylinder having a piston operatively connected to said clutch pedal, two gear shifting forks operatively connected to the gearing to be each capable of movement in opposite directions to selectively shift the gearing, four actuating hydraulic cylinders each operatively connected to a shifting fork to respectively actuate said shifting forks in opposite directions, a master valve comprising four discharge ports from said hydraulic cylinder respectively hydraulically connected to each respective hydraulic actuating cylinder, four rods normally closing said ports, and means operatively connected to a valve rod and actuated by the speed of the drive shaft to actuate a respective valve rod to open a selected port to permit discharge of fluid from said master hydraulic cylinder on depression of said clutch pedal to selectively shift the gearing proportionate to the speed of the drive shaft and means associated with said shifting forks to retain said selected gear in mesh.

15. In a gear shifting device for vehicles having a motor, a drive shaft, shiftable selective speed gearing connecting said motor and drive shaft, and a clutch pedal to disengage said motor and drive shaft during selective changing of said gearing, means comprising a plurality of elements operatively connected to the gearing for selectively shifting the gearing, hydraulically actuated means operatively connected to said clutch pedal and said first mentioned means actuable by depression of said clutch pedal to actuate said first mentioned means, and electrical means operatively connected to said drive shaft and hydraulically actuated means automatically controlled by the speed of said drive shaft to select the proper element to shift the gearing on movement of said clutch pedal, suitable for the then speed of said drive shaft and means connected to said clutch pedal to permit movement of said element to neutral position at the start of another actuation of said clutch pedal.

16. In a gear shifting device for vehicles having a motor, a drive shaft, shiftable selective speed gearing connecting said motor and drive shaft, and a clutch pedal to disengage said motor and drive shaft during selective changing of said gearing, means comprising a plurality of elements operatively connected to the gearing for selectively shifting the gearing, hydraulically actuated means operatively connected to said clutch pedal and said first mentioned means actuable by depression of said clutch pedal to actuate said first mentioned means, and electrical means operatively connected to said drive shaft and hydraulically actuated means automatically controlled by the speed of said drive shaft to select the proper element to shift the gearing on movement of said clutch pedal, suitable for the then speed of said drive shaft and means connected to said clutch pedal operable on initiation of said movement of said clutch pedal to release a shifting fork to unmesh the gearing whereby a single movement of the clutch pedal alone may effect a complete change of gearing.

17. In a gear shifting device for vehicles having a motor, a drive shaft, shiftable selective speed gearing connecting said motor and drive shaft, and a clutch pedal to disengage said motor and drive shaft during selective changing of said gearing, means comprising a plurality of elements operatively connected to the gearing for selectively shifting the gearing, means operatively connected to the clutch pedal and to said first mentioned means actuable by depression of said clutch pedal to actuate said first mentioned means, and means operatively connected to the drive shaft and said first mentioned means controlled by the speed of said drive shaft to select the proper element to shift the gearing on movement of said clutch pedal, suitable for the then speed of said drive shaft and means connected to said clutch pedal to permit movement of said element to neutral position at the start of another actuation of said clutch pedal.

18. In a gear shifting device for vehicles having a motor, a drive shaft, shiftable selective speed gearing connecting said motor and drive shaft, and a clutch pedal to disengage said motor and drive shaft during selective changing of said gearing, means operatively connected to the gearing comprising a plurality of elements for selectively shifting the gearing, means operatively connected to said clutch pedal and said first mentioned means actuable by depression of said clutch pedal alone to actuate said first mentioned means, and means operatively connected to the drive shaft and said first mentioned means automatically controlled by the speed of said drive shaft to select the proper element to shift the gearing on movement of said clutch pedal, suitable for the then speed of said drive shaft and means connected to said clutch pedal operable on initiation of movement of said clutch pedal to release an element to unmesh said gearing whereby a single movement of the clutch pedal alone may effect a complete change of gearing.

19. In a gear shifting device for vehicles having a motor, a drive shaft, shiftable selective speed gearing connecting said motor and drive shaft, a housing for said gearing, a clutch pedal to disengage said motor and drive shaft during selective changing of said gearing, a master hydraulic cylinder having a piston operatively connected to said clutch pedal, two gear shifting forks operatively connected to the gearing to be each capable of movement in opposite directions to selectively shift the gearing, four actuating hydraulic cylinders each operatively connected to a shifting fork to respectively actuate said shifting forks in opposite directions, a master valve comprising four discharge ports from said hydraulic cylinder hydraulically connected to each respective hydraulic actuating cylinder, four rods normally closing said ports, and four solenoids each operatively connected to a rod and each being selectively capable on actuation thereof to move a rod to selectively open a port, switch means comprising contact portions individually connected to a selected solenoid in said master valve, and governor means operatively connected to the drive shaft to be rotatably responsive to the speed of said drive shaft connectable to a selective contact portion to selectively complete a circuit through said respective contact portion proportionate to the speed of said drive shaft to actuate a respective valve rod to open a selected port to permit discharge of fluid from said master hydraulic cylinder on depression of said clutch pedal to selectively shift the gearing proportionate to the speed of the drive shaft, means associated with said shifting forks to retain said selected gear in mesh and means connected to said clutch pedal to permit movement of said actuated shifting fork to neutral position at the start of another actuation of said clutch pedal, comprising shaft means connected to each shifting fork longitudinally slidable in said housing having lug means projecting laterally therefrom and having three lateral notches near one end thereof, spring means mounted in said housing to abut opposite sides of said lug means to normally urge said rod means and connected shifting forks to neutral position, a locking rod transversely slidable in said housing having lug means projecting inwardly therefrom to be selectively inserted in a selected notch terminating in an outer end bent at right angles thereto exterior laterally of said housing, spring means normally urging said locking rod means to normally bring the lug means thereof into engagement with a selected notch, and a wedge longitudinally slidable laterally of said housing to abut said locking rod outer end and operatively connected to said clutch pedal having an outer surface outwardly inclined towards the rear thereof to urge the more outwardly inclined rear end thereof forwardly on depression of said clutch pedal to bring the lug means of said transversely slidably mounted locking rod out of engagement with the respective notch in said longitudinally slidable shaft means to permit said spring means to move said shifting fork to neutral position.

20. In a gear shifting device for vehicles having a motor, a drive shaft, shiftable selective speed gearing connecting said motor and drive shaft, a housing for said gearing, a clutch pedal to disengage said motor and drive shaft during selective changing of said gearing, two gear shifting forks operatively connected to the gearing to be each capable of movement in opposite directions to selectively shift the gearing, hydraulically actuated means operatively connected to said shifting forks and clutch pedal to be actuatable by depression of said clutch pedal to selectively operate a selected shifting fork in a selected direction to selectively change the gearing, and electrical means operatively connected to the drive shaft and hydraulically actuated means to be controlled by the speed of said drive shaft to select the proper directional movement of the proper shifting fork to shift the gearing on movement of said clutch pedal, suitable for the then speed of said drive shaft, and means connected to said clutch pedal to permit movement of said actuated shifting fork to neutral position at the start of another actuation of said clutch pedal, comprising shaft means connected to each shifting fork longitudinally slidable in said housing having lug means projecting laterally therefrom and having three lateral notches near one end thereof, spring means mounted in said housing to abut opposite sides of said lug means to normally urge said rod means and connected shifting forks to neutral position, a locking rod transversely slidable in said housing having lug means projecting inwardly therefrom to be selectively inserted in a selected notch terminating in an outer end bent at right angles thereto exterior laterally of said housing, spring means normally urging said locking rod means to normally bring the lug means thereof into engagement with a selected notch, and a wedge longitudinally slidable laterally of said housing to abut said locking rod outer end and operatively connected to said clutch pedal having an outer surface outwardly inclined towards the rear thereof to urge the more outwardly inclined rear end thereof forwardly on depression of said clutch pedal to bring the lug means of said transversely slidably mounted locking rod out of engagement with the respective notch in said longitudinally slidable shaft means to permit said spring means to move said shifting fork to neutral position.

21. In a gear shifting device for vehicles having a motor, a drive shaft, shiftable selective speed gearing connecting said motor and drive shaft, and a clutch pedal to disengage said motor and drive shaft during selective changing of said gearing, two gear shifting forks, each operatively connected to the gearing to be capable of movement in opposite directions to selectively shift the gearing, hydraulically actuated means operatively connected to said clutch pedal and shifting forks actuatable by depression of said clutch pedal to selectively operate a selected shifting fork in a selected direction to selectively change the gearing, and electrical means operatively connected to said hydraulically actuated means automatically controlled by the speed of said drive shaft to select the proper directional movement of the proper shifting fork to shift the gearing on movement of said clutch pedal suitable for the then speed of said drive shaft, means associated with said shifting fork to retain said selected gear in mesh, and means connected to said clutch pedal operable on initiation of said movement of said clutch pedal to release said means to permit movement of said shifting fork to unmesh the gearing whereby a single movement of the clutch pedal alone may effect a complete change of gearing.

22. In a gear shifting device for vehicles having a motor, a drive shaft, shiftable selective speed gearing connecting said motor and drive shaft, and a clutch pedal to disengage said motor and drive shaft during selective changing of said gearing, means comprising a plurality of elements operatively connected to the gearing for selectively shifting the gearing, hydraulically actuated means operatively connected to said clutch pedal and said first mentioned means actuable by depression of said clutch pedal to actuate said first mentioned means and electrical means operatively connected to said drive shaft and hydraulically actuated means automatically controlled by the speed of said drive shaft to select the proper element to shift the gearing on movement of said clutch pedal, suitable for the then speed of said drive shaft means associated with said shifting fork to retain said selected gear in mesh, and means connected to said clutch pedal operable on initiation of said movement of said clutch pedal to release said means to permit movement of said shifting fork to unmesh the gearing whereby a single movement of the clutch pedal alone may effect a complete change of gearing.

23. In a gear shifting device for vehicles having a motor, a drive shaft, shiftable selective speed gearing connecting said motor and drive shaft, and a clutch pedal to disengage said motor and drive shaft during selective changing of said gearing, means operatively connected to the gearing comprising a plurality of elements for selectively shifting the gearing, means operatively connected to said clutch pedal and said first mentioned means actuable by depression of said clutch pedal alone to actuate said first mentioned means, and means operatively connected to the drive shaft and said first mentioned means automatically controlled by the speed of said drive shaft to select the proper element to shift the gearing on movement of said clutch pedal, suitable for the then speed of said drive shaft, means associated with said clutch pedal to retain the selected gear in mesh, and means connected to said clutch pedal operable on initiation of movement of said clutch pedal to release said means to permit movement of said element to unmesh said gearing whereby a single movement of the clutch pedal alone may effect a complete change of gearing.

RALPH GAMBARDELLA.